Nov. 15, 1938.  A. H. STARKWEATHER  2,136,642
LEAD SCREW ADJUSTING DEVICE
Filed July 27, 1937
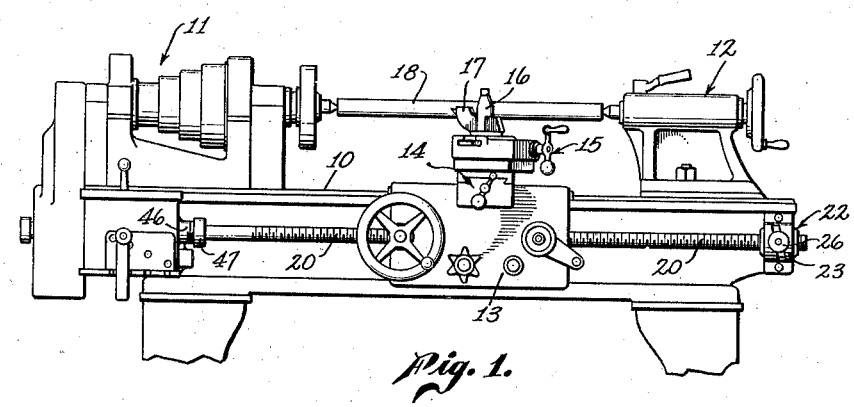
Fig. 1.
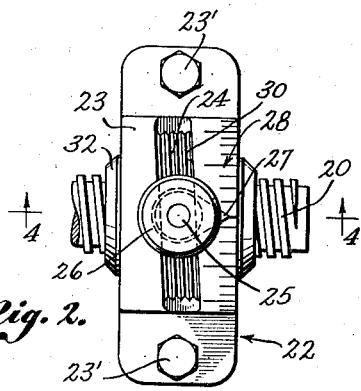
Fig. 2.
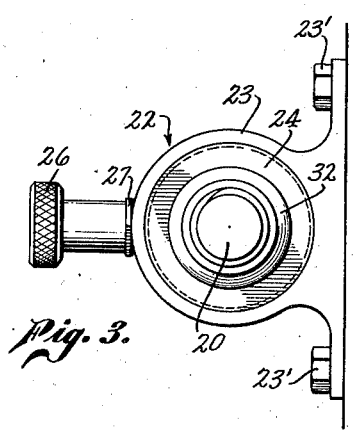
Fig. 3.
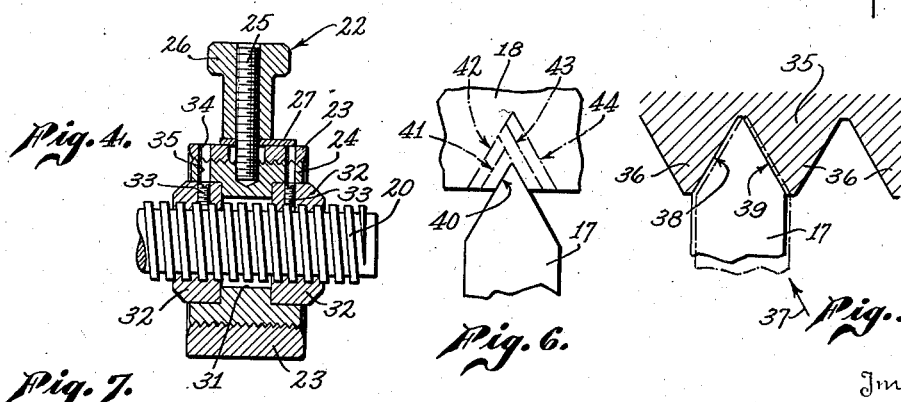
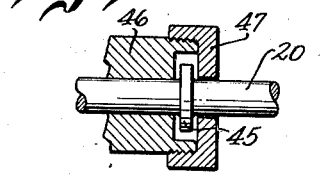
Inventor
Asa H. Starkweather
By Frank Parnham
Attorney Patented Nov. 15, 1938

2,136,642

UNITED STATES PATENT OFFICE 2,136,642

LEAD SCREW ADJUSTING DEVICE

Asa H. Starkweather, Los Angeles, Calif.

Application July 27, 1937, Serial No. 155,932

2 Claims. (Cl. 82—27)

This invention relates in general to lathes and more particularly to an attachment for the lathes especially designed to facilitate the carrying out of various thread forming operations and is more particularly directed to a lead screw adjusting device by which the position of the lead screw may be shifted longitudinally without interfering with the lead timing mechanism.

As an example of one of the uses of my present invention it is pointed out that in cutting threads on a lathe as for instance a turret lathe the cutter is fed into the work perpendicular to the blank in which the threads are to be cut. This operation results in both sides of the thread being cut at the same time with a consequent rapid dulling of the cutter. With my invention the cutter may be fed into the blank so that after the first cut the cutter may be shifted laterally by shifting the lead screw so that the next cut is made principally on one side of the cutter. After several cuts are made in this manner and the cutter shifted at each cut, the thread may be finished by shifting the cutter after each cut in the opposite direction.

In the operation of cutting threads particularly where such operation is performed on a lathe equipped with a thirty degree feed and in which only one side of the thread is cut throughout its depth by one side of the cutting tool the result is that the opposite side of the thread presents an uneven surface which must be finished before the thread may be said to be acceptable. In such cases by moving or shifting the lead screw longitudinally without interfering with the lead the opposite side of the cutting tool may be moved into contact with the uneven face of the thread and such face finished throughout its depth by a single cutting operation throughout, one cutting face of the tool engaging such side of the thread.

It is the principal object of this invention to provide a simple, inexpensive attachment which may be placed upon the ordinary lathe which attachment receives and supports the lead screw and by means of which by a simple manipulation the lead screw may be shifted longitudinally.

It is to be understood that my attachment, herein described, may be used on any portion of the lead screw, at either end and may be used as a substitute for the ordinary supporting bearings of the feed screw.

Referring to the drawing, which is for illustrative purposes only—

Fig. 1 is a side view of a common form of lathe showing the application of a device embodying my invention to such lathe;

Fig. 2 is an enlarged face view of the attachment;

Fig. 3 is an end view of the attachment shown in Fig. 2;

Fig. 4 is a sectional view on line 4—4 of Fig. 2;

Fig. 5 is a diagrammatic view of a screw thread, the cutter, and the position of the cutter resulting from a shifting of the lead screw, above referred to;

Fig. 6 is a diagrammatic view of a thread cut by shifting the lead screw laterally in both directions; and Fig. 7 is a sectional view of the end thrust bearing for the lead screw.

Referring more particularly to the drawing, 10 designates the bed of a lathe having a headstock 11 mounted thereon at one end and a tail-stock 12 adjustably mounted on the bed at the other end thereof. 13 designates a tool supporting carriage having the usual crosswise adjustment generally indicated at 14 and the thirty degree angle adjustment commonly referred to as the "combination", indicated at 15. Mounted on the "combination" is the tool post 16 in which is mounted the cutting tool 17 in proper position for engagement with the blank 18 upon which the threads are to be cut, which blank is mounted in the usual manner between the lathe centers. 20 designates the lead screw of ordinary construction which is driven in the usual manner by the common gearing from the headstock spindle, the lead screw being driven in timed relation with the headstock spindle as done in common practice.

In the form of my invention, as shown, the attachment generally indicated at 22 is shown secured to the bed of the lathe in place of the usual supporting bearing for the lead screw but as pointed out hereinabove, it is to be understood that my attachment may be placed at any desired position on the lead screw.

The attachment consists of a supporting member in the form of a bracket 23 attached to the bed of the lathe by means of suitable bolts 23'. The bracket 23 is interiorly threaded to receive a threaded sleeve 24, the inner engaging threads of these two members being of small pitch so that a very minute adjustment may be had. The sleeve 24 is movable in the bracket by means of a threaded post 25 operated by means of a nut 26. A pointer 27 is mounted on the post between the bracket and nut 26, which pointer rides over a scale on the outside of the bracket indicated at 28, it being understood that by tightening the nut 26 the position of the sleeve in the bracket may be fixed at such desired point as the nature of the work may require. As shown, particularly in Fig. 2, the bracket 23 is provided with an angular slot 30 to accommodate the movement of the post 25.

The sleeve 24 is provided with an inwardly projecting circular flange 31 the sides of which form abutments for lock nuts 32 which lock nuts are interiorly threaded to engage the lead screw 20. For the purpose of fixing the nuts 32, with respect to the lead screw, threaded pins, indicated at 33, are provided in the nuts 32 the inner ends of which engage the lead screw. These threaded pins 33 are introduced into the nuts through openings 34 and 35 in the bracket and sleeve respectively.

My attachment operates in the following manner:

It being understood that the lead screw 20 is connected to its driving mechanism in such a manner as to permit a slight longitudinal shifting of the screw and that the screw is engaged by the nuts 32 it will be understood that any movement of the sleeve 24 longitudinally with respect to the axis of the lead screw that the lead screw will be moved or shifted longitudinally by such engagement. While there are other particular purposes for which shifting of the lead screw may be desired I have diagrammatically illustrated one use in Fig. 5. In this figure, 35 illustrates a blank in which threads, indicated at 36, have been cut. Assuming that such thread has been cut with the "combination," that is, by feeding the cutter into the blank on a thirty degree angle as indicated by the arrow 37 in Fig. 5. One side of the thread, indicated at 38, has been cut throughout its depth by the entire face of one side of the tool engaging such side of the thread. Whereas, the side of the thread, indicated at 39, would have a series of tool marks one for each step of the tool as it is moved inwardly during the cutting operation. After the threads have been cut to their normal depths, the face 39 of the thread may then be finished by loosening the nut 26 and turning the sleeve 24 in the bracket 23. This movement shifts the lead screw and carriage 13 together with the cutter into the broken line position as shown in Fig. 5, thereby cutting sufficient metal from the side 39 of the tooth to finish the same and bring it to proper finish. It is understood that this shifting movement may only vary the position of the cutter a ten thousandth of an inch or less and does not in any way affect the true pitch of the thread. When it is desired to cut a thread by shifting the lead screw in both directions as might be the case where a lathe is used such as a turret lathe, as illustrated in Fig. 6, the cutter indicated at 17 first makes a cut into the blank 18 as shown at 40. After this cut the lead screw is shifted and a cut made represented by the numeral 41. This is followed by a shifting of the lead screw and a cut made represented by the numeral 42. The lead screw is then shifted in the opposite direction and cut 43 made followed by another shifting of the lead screw resulting in the final cut 44 and finishing of the thread.

In the form of lead screw arrangement shown in Fig. 1 provision for allowing shifting of the lead screw is made by providing play for the flange 45 on the lead screw 20 between the end of the gear box 46 and a cap 47 threaded thereon, the attachment 22 serving as an end thrust bearing.

While I have shown and described my invention as applied to a particular type of lathe it is to be understood that it may be applied to other types of machines having lead screws without departing from the spirit of my invention.

I claim as my invention:

1. In a lead screw attachment for lathes and the like, an interiorly threaded bracket; a threaded sleeve in said bracket; an inwardly extending circular flange on said sleeve; a nut on the lead screw on each side of the flange in engagement therewith; means for securing said nuts to the lead screw; and means for rotating said sleeve, said sleeve rotating means comprising a post on said sleeve extending through an opening in said bracket.

2. In a lead screw attachment for lathes and the like, an interiorly threaded bracket; a threaded sleeve in said bracket; an inwardly extending circular flange on said sleeve; a nut on the lead screw on each side of the flange in engagement therewith; means for securing said nuts to the lead screw; means for rotating said sleeve, said sleeve rotating means comprising a post on said sleeve extending through an opening in said bracket; scale means on said bracket; indicator means on said post; and a nut on said post engageable with said indicator means to clamp the post in adjusted position.

ASA H. STARKWEATHER.